Figure 1:
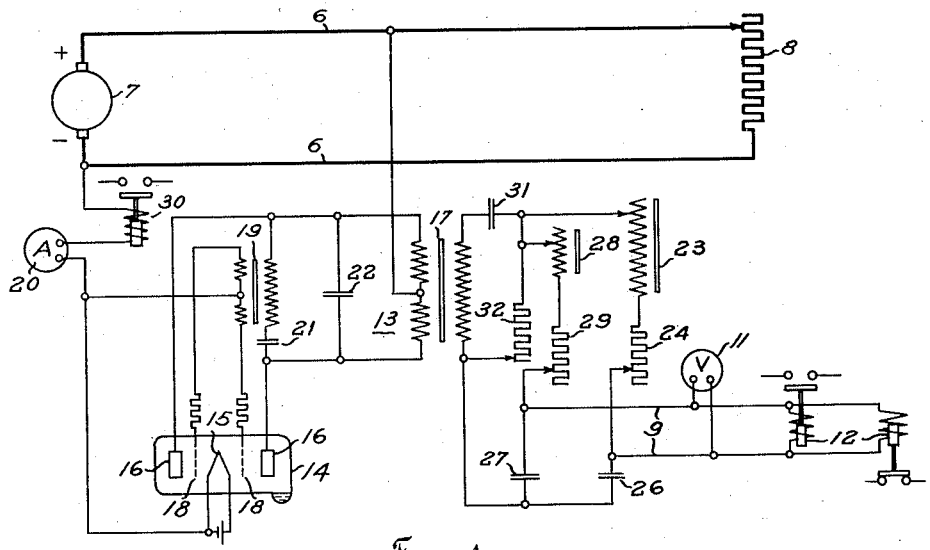

Dec. 6, 1938.  D. JOURNEAUX  2,139,637
ELECTRIC CONTROL SYSTEM
Filed Aug. 23, 1935  2 Sheets-Sheet 1

Inventor
D. Journeaux
by [signature]
Attorney

Dec. 6, 1938.  D. JOURNEAUX  2,139,637

ELECTRIC CONTROL SYSTEM

Filed Aug. 23, 1935  2 Sheets-Sheet 2

Inventor
D. Journeaux
by [signature]
Attorney

Patented Dec. 6, 1938

2,139,637

UNITED STATES PATENT OFFICE 2,139,637

ELECTRIC CONTROL SYSTEM

Didier Journeaux, Wauwatosa, Wis., assignor to Allis-Chalmers Manufacturing Company, Milwaukee, Wis., a corporation of Delaware Application August 23, 1935, Serial No. 37,458

12 Claims. (Cl. 175—320)

This invention relates in general to electric control systems, and more particularly to means for energizing control apparatus from a direct current source or circuit in a manner such as to render the apparatus highly discriminating with respect to variations of an operating value of the direct current circuit.

In electric control systems, use is frequently made of contact apparatus responsive to the magnitude of the voltage or current of a direct current circuit for the purpose of controlling the operation of a generator or of control equipment connected therewith. Such contact apparatus, and more particularly the so-called contact making voltmeters and ammeters, are generally required to open and to close a contact at values, of the quantity to which they are responsive, differing by a relatively small amount. Such apparatus are therefore necessarily delicate, expensive to manufacture, and are not well adapted to the manufacture thereof in large quantities.

Such disadvantages may be avoided by energizing an ordinary alternating current control apparatus from an alternating current circuit through impedance means sensitive to the magnitude of the direct current or voltage to be measured. While such system is more complicated than a single relay of the known type it comprises only rugged and inexpensive elements and is therefore relatively inexpensive and reduces the amount of attention required while retaining the desired sensitiveness.

It is therefore an object of the present invention to provide a system responsive to an operating condition of a direct current circuit, by which the variations of the quantity to be measured are amplified in the output circuit of the system.

Another object of the present invention is to provide a system responsive to an operating condition of a direct current circuit by which the variations of the quantity to be measured are utilized for modifying the impedance of an alternating current circuit.

Another object of the present invention is to provide a system responsive to an operating condition of a direct current circuit by which the variations of the quantity to be measured are transmitted to an alternating current translating device energized through non-linear resonant impedance means.

Figure 2:
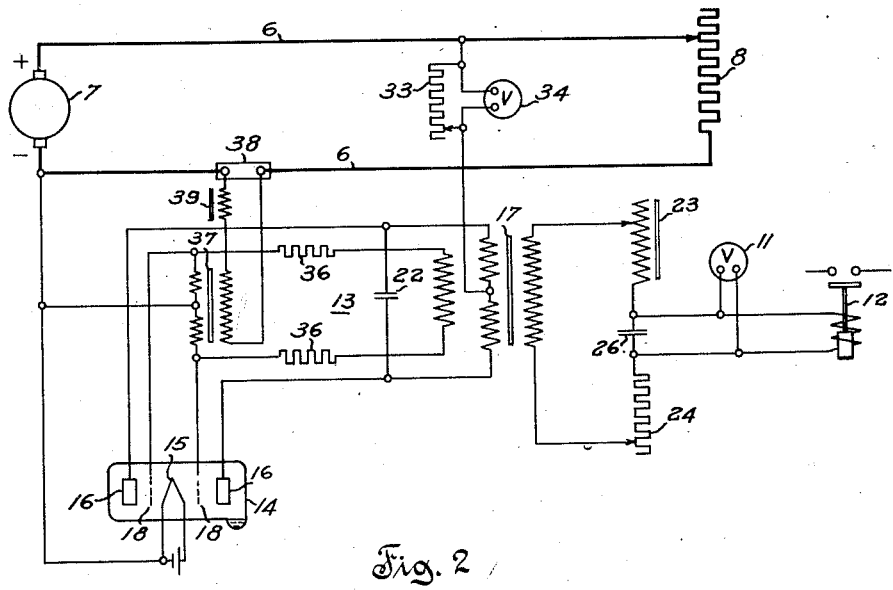
Figure 3:
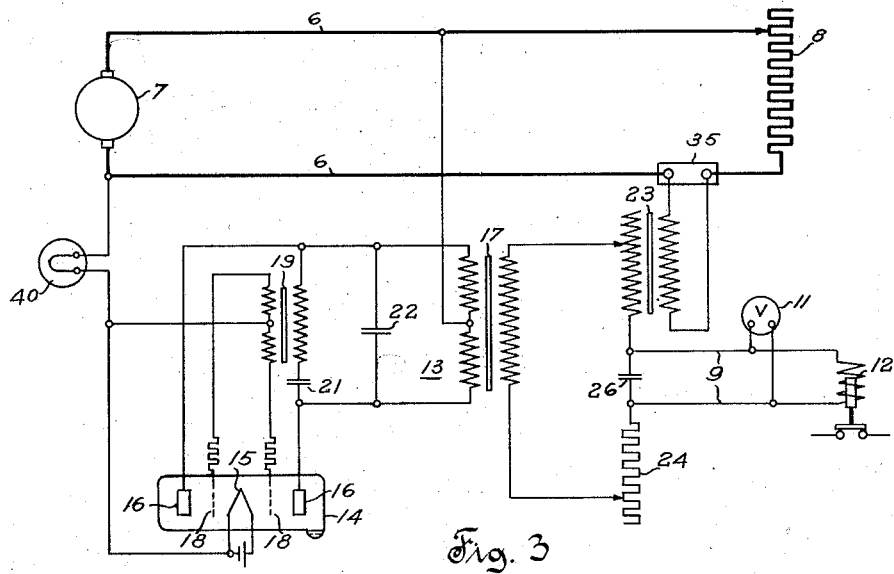
Figure 4:
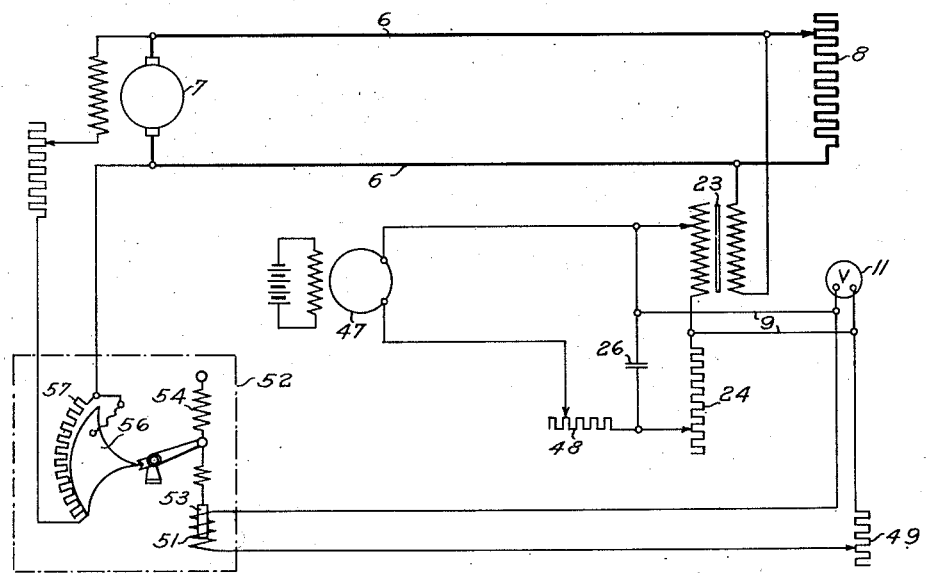

Objects and advantages other than those above set forth will be apparent from the following description when read in connection with the accompanying drawings, in which:

Fig. 1 diagrammatically illustrates one embodiment of the present invention responsive to the value of the voltage of a direct current circuit, in which such voltage is impressed in modified form on a translating device through a direct current inverter;

Fig. 2 diagrammatically illustrates a modified embodiment of the present invention, differing from the embodiment illustrated in Fig. 1 in that the inverter delivers a voltage of frequency modified in response to the magnitude of the flow of current through the direct current circuit;

Fig. 3 diagrammatically illustrates another modified embodiment of the present invention differing from the embodiment illustrated in Fig. 1 in that the inverter delivers a voltage of substantially constant magnitude to a translating device through impedance means including a reactor saturable in response to the magnitude of the flow of current in the direct current circuit; and Fig. 4 diagrammatically illustrates another embodiment of the present invention in which a translating device receives current from an alternating current source through impedance means including a reactor saturable in response to the magnitude of the voltage of the direct current circuit.

It will be understood that elements shown in any one of the figures may also be utilized in combination with elements of the other figures to form further embodiments of the present invention.

Referring more particularly to the drawings by characters of reference, the direct current circuit of which an operating condition is to be measured or utilized for control purposes is represented by a pair of conductors 6 connecting a generator 7 with a variable load device 8. In accordance with the present invention, the variations of such operating condition are translated into variations of the voltage of an alternating current circuit 9, such variations being utilized for the operation of comparatively insensitive translating devices such as a voltmeter 11, control relays 12, or any other control apparatus connected therewith. Such control apparatus may be provided for any desired control operation such as controlling the energization of generator 7, or controlling switching operations of line 6 or of load device 8 as is well known in the art.

In Fig. 1 an alternating voltage is impressed on circuit 9 by means of a static inverter generally designated by 13, which may be of any of the types known in the art. Such inverter preferably comprises an electric valve 14 having a cathode 15 connected with the negative conductor of line 6. The valve is provided with anodes 16 connected with the positive conductor of circuit 6 through the two halves of the primary winding of an output transformer 17. The operation of valve 14 is controlled by means of control electrodes 18 thereof, which are energized from the anode circuit through a transformer 19. Such transformer is energized through a capacitor 21 to cause the control potentials impressed on electrodes 18 to lead the potentials of anodes 16, such potentials being referred to the potential of cathode 15 taken as datum. If valve 14 is of the vapor type, a capacitor 22 is utilized for transferring the flow of current from one anode 16 to the other anode 16 in response to the alternate energization of the two control electrodes 18. An ammeter 20 may be inserted in the connection between circuit 6 and inverter 13.

The alternating current circuit 9 is connected with transformer 17 through non-linear resonant impedance means which may be arranged to form different combinations. Such impedance means generally include reactance, capacitance and resistance elements which constitute means non-linearly responsive to the output voltage of transformer 17, and therefore also responsive to the magnitude of the voltage of circuit 6, for controlling the voltage impressed on circuit 9 by inverter 13. Circuit 9 is connected across at least one of such impedance means, the connection being such that the voltage thereof varies to a greater relative extent than the voltage of circuit 6. As shown in Fig. 1, transformer 17 supplies current to a first non-linearly resonant circuit consisting of a reactor 23, a resistor 24 and a capacitor 26 so adjusted that the voltage of capacitor 26 varies to a large relative extent in response to small relative increase of the voltage of transformer 17 and of circuit 6 above a predetermined value. In other words, the circuit comprising elements 23, 24 and 26 has a non-linear volt-ampere characteristic. Circuit 9 may also be connected across capacitor 26, or across such capacitor and a second capacitor 27 forming part of a second non-linear circuit comprising a reactor 28 and a resistor 29, the two circuits being connected in parallel. The effect of frequency variations of inverter 13 on such circuits may be neutralized by a capacitor 31 cooperating with a resistor 32.

In operation, circuit 6 being energized by generator 7, inverter 13 draws current from circuit 6 alternately through one and through the other anode 16 of valve 14, thus causing an alternating voltage to appear at the terminals of transformer 17 as is well known in the art. Such voltage is of a magnitude substantially proportional to the magnitude of the voltage of circuit 6, and of a frequency depending upon the nature of the circuits connected with transformers 17 and 19. When the voltages of circuit 6 and of transformer 17 vary without exceeding a predetermined limit, the degree of saturation of the cores of reactors 23 and 28 is comparatively low, and the flow of current through such reactors is maintained at a low value by the high impedance of the windings thereof. The limit below which such condition obtains is accurately determined by the relative dimensions of reactors 23 and 28 and of capacitors 26 and 27, and by the frequency of the voltage of transformer 17. When the voltage of transformer 17 increases to a small relative extent above such limit, the core of reactor 23 reaches a higher degree of saturation and the impedance of reactor 23 is decreased to an extent such that the reactor enters into resonance with capacitor 26 for the frequency of the voltage impressed thereon. The flow of current through reactor 23 and capacitor 26 thus abruptly increases to a large extent, and the voltage across capacitor 26 accordingly increases, thus varying the energization of circuit 9 to a large relative extent in response to a small relative increase of the voltage of circuit 6. The comparatively insensitive translating devices connected with circuit 9, which receive only a negligible voltage as long as the voltage of circuit 6 remains below the limit above considered, now receive a comparatively large voltage and operate in response thereto. When such voltage reaches another higher predetermined value, reactor 28 and capacitor 27 become resonant for the frequency of the voltage of transformer 17, and the voltage across capacitor 27 again increases abruptly. The voltage of circuit 9 is thus rapidly decreased from a large value to a comparatively negligible value, and the translating devices connected therewith return to the inoperative condition.

When the voltage of circuit 6 decreases, the above sequence of operations is reversed; depending upon the value of resistors 24 and 29, the range of values of the voltage of circuit 6 for which circuit 9 receives a material voltage may be the same when the voltage of circuit 6 increases or decreases, or may be different for such two conditions. The variations of the impedance of the elements supplied from transformer 17 cause the frequency of inverter 13 to vary, but such variation is neutralized by the action of capacitor 31 and of resistor 32.

The variations of the flow of current through capacitors 26 and 27, which cause the voltage variation of circuit 9, are reflected in a variable flow of direct current from circuit 6 to inverter 13. Direct current ammeter 20 connected therebetween may therefore also be utilized to indicate departures of the voltage of circuit 6 from the desired value, and a relay 30 serially connected therewith may serve for initiating control operations in response to the value of the voltage of circuit 6. When both reactors 23 and 28 become resonant with the associated capacitors 26 and 27, the effect of the increased flows of current therethrough, which are subtractive with respect to circuit 9, are additive with respect to the flow of current through ammeter 20 and relay 30. Relay 30 therefore does not return to the deenergized position when the voltage of circuit 6 increases materially above the desired value. Ammeter 20 may also be so calibrated that the pointer thereof moves from one end to the other end of the scale when the voltage of circuit 6 varies by a relatively small amount, so that the ammeter may be calibrated to read the voltage of circuit 6 with a greater degree of accuracy than would be obtainable with a voltmeter directly connected with the circuit.

In the embodiment illustrated in Fig. 2, inverter 13 is connected with circuit 6 through an adjustable resistor 33 bridged by a voltmeter 34. Control electrodes 18 are energized from a tertiary winding of transformer 17 through a pair of resistors 36. Such resistors also conduct current to a reactor 37 having a midtap connected with cathode 15, and having a direct current saturating winding energized from circuit 6 through a shunt 38. As is well known, such saturating winding is preferably so arranged that the flow of current therethrough has equal effects on the alternate half-waves of current through the alternating current winding of the reactor, and also that no appreciable alternating current component is induced therein from the alternating current winding. Any such component accidentally appearing may be reduced to a negligible value by means of a reactor 39 serially connected with the saturating winding. In the present embodiment, circuit 9 is connected across capacitor 26, elements 27, 28, 29, 31 and 32 illustrated in Fig. 1 being omitted.

In operation, inverter 13 functions in the same manner as in the embodiment illustrated in Fig. 1. Disregarding at first the effect of the flow of current in circuit 6 on the saturation of reactor 37, and assuming that the voltage of circuit 6 is such that reactor 23 and capacitor 26 are not in resonance, the flow of current through capacitor 26 remains small; the voltage across such capacitor, which is also the voltage of circuit 9, remains at a negligible value. When the voltage of circuit 6 increases above a predetermined value depending upon the dimensions of reactor 23 and of capacitor 26 and upon the frequency of the voltage of transformer 17, the reactor and the capacitor become resonant, and the flow of current therethrough increases abruptly. As the voltage of circuit 6 continues to increase, the voltage of circuit 9 likewise continues to increase but at a rate which is less than the initial rate of increase thereof and which diminishes gradually. The translating devices connected with circuit 9 therefore remain operatively energized as the voltage of circuit 9 goes on increasing, such devices becoming deenergized only when the voltage of circuit 6 decreases below a value depending on the value of resistor 24.

Such effect is modified by the action of the saturating winding of reactor 37. Such winding receives a current proportional to the flow of current through circuit 6, thus causing the core of the reactor to become increasingly saturated for increasing values of the current in circuit 6. As a result thereof reactor 37 draws from transformer 17 an increasing amount of lagging current which causes an increasing voltage drop in resistors 36. As may be determined by any of the methods of alternating current analysis, the potential of control electrodes 18 is thus caused to lead the potential of anodes 16 by an increasing amount, causing the frequency of the output voltage of transformer 17 to increase gradually. The magnitude of the voltage required to cause reactor 23 to become resonant with capacitor 26 is thus gradually increased. For any particular value of the voltage of circuit 6, reactor 23 and capacitor 26 will be caused to enter into resonance by a small decrease of the flow of current in circuit 6 below a value depending upon the voltage value considered.

The voltage drop caused in resistor 33 by the increased flow of current through inverter 13 may also be utilized for any indicating or controlling operations and may be read on the scale of voltmeter 34.

In the embodiment illustrated in Fig. 3 inverter 13 is connected as shown in Fig. 1, while circuit 9 is connected with transformer 17 as shown in Fig. 2. In the present embodiment, reactor 23 is provided with a direct current saturating winding energized in response to the magnitude of the flow of current through circuit 6 by means of shunt 35. Assuming that it is desired to render circuit 9 substantially insensitive to the voltage variations of circuit 6, a regulator may be inserted in a connection between circuits 6 and 9. Such regulator may consist of a non-linear resistor such as a resistor 40 made of iron operated at high temperature in a high vacuum or in hydrogen, or may consist of a self-regulating transformer connected between transformer 17 and the non-linear resonant circuit associated therewith. Reactor 23 and capacitor 26 are normally in non-resonant condition, and become resonant with each other upon decrease of the inductance of reactor 23 as a result of the flow of current above a predetermined limit through the saturating winding thereof to thereby cause operation of the devices energized from circuit 9.

In the embodiment illustrated in Fig. 4, an alternating current voltage of constant magnitude and frequency is assumed to be directly obtained from a suitable source such as an alternating current generator 47 through a current limiting resistor 48. In general, however, such voltage will be obtained from the usual alternating current lighting circuits, which are generally of constant voltage and frequency. Capacitor 26 is connected in parallel with a series circuit comprising reactor 23 and resistor 24. The saturating winding of reactor 23 may be connected as shown in Fig. 3, or may be connected across circuit 6 to render the system responsive to the magnitude of the voltage of such circuit.

Circuit 9 is connected across reactor 23, and accordingly receives a comparatively low voltage when the reactor 23 and capacitor 26 are not in resonance. If the voltage of circuit 6 increases above a predetermined limit, the reactance of reactor 23 is decreased to a value such that the reactor enters into resonance with capacitor 26, with the result that the voltage impressed on circuit 9 is abruptly increased to a material value. In the present embodiment, such voltage is impressed, through an adjusting resistance 49, on the actuating solenoid 51 of a regulator generally designated by 52. Such solenoid acts on an armature 53 against the action of a spring 54 to move a sector 56 constituting a tap for a resistor 57 included in the field circuit of generator 7. When the voltage of generator 7 is below the desired value, regulator 52 is in the position shown thereby short circuiting resistor 57, and maintaining the field current of generator 7 at the maximum value thereof. If the voltage of circuit 6 increases to small extent above the desired value thereof, the voltage of circuit 9 abruptly increases to a material value as above explained, and solenoid 51 moves armature 53 and sector 56 against the action of spring 54 to insert a variable portion of resistor 57 in the field circuit of generator 7 to cause the voltage of the generator to decrease. If such voltage decreases below the desired value, the voltage of circuit 9 decreases abruptly, thereby causing the regulator 52 to return towards the position shown. In this manner the regulator maintains the voltage of the generator at the desired value with a much higher degree of accuracy than if solenoid 51 was directly connected across circuit 6.

Summarizing, in the embodiments of the present invention herein illustrated and all comprising a direct current circuit 6 and an alternating current circuit 9, inverter 13 or generator 47 constitute means for impressing an alternating voltage on circuit 9 and on the translating devices connected therewith. The voltage thus impressed on circuit 9 is controlled by impedance means 23, 24, 26 and 27, which are non-linearly responsive to an operating condition of circuit 6. Such impedance means constitute at least one non-linear resonant circuit to cause the voltage across at least one of such means to vary in response to the variations of an electrical condition of circuit 6 to a greater extent than such electrical condition varies, circuit 9 being connected to receive the variable voltage so obtained. Inverter 13 in Figs. 1, 2 and 3, and reactor 23 with the saturating winding thereof and capacitor 26 in Fig. 4, constitute a translating system having a non-linear voltampere characteristic connecting relay 12 with circuit 6 for rendering such relay responsive to an operating condition of circuit 6. Such system is operable to vary the energization of relay 12 to a large relative extent in response to a small relative increase of the voltage of circuit 6 or of the flow of current therethrough above a predetermined value. In the embodiment illustrated in Fig. 1, such system operates only in response to variations of the voltage below another greater predetermined value. Such results are obtained for the reason that the impedance means connecting circuit 9 with inverter 13 or generator 47 are of value variable with the voltage impressed thereon, and may thus be connected with circuit 9 for impressing thereon a voltage variable disproportionately to the voltage of circuit 6. In Figs. 2 and 3 reactor 23 is responsive to the magnitude of the flow of current in circuit 6 to cause the impedance means, of which such reactor is a part, to offer a variable impedance to the alternating voltage impressed on circuit 9.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In combination, a direct current circuit, an alternating current circuit, a direct current inverting system having input terminals connected with said direct current circuit to receive current therefrom and having output terminals, and impedance means of value variable with the voltage impressed thereon and connecting the output terminals of said system with said alternating current circuit.

2. In combination, a direct current circuit, an alternating current circuit, a direct current inverting system energized from said direct current circuit for producing an alternating voltage, impedance means connecting said alternating current circuit with said system, and means responsive to the magnitude of the flow of current in said input circuit for causing said impedance means to offer a variable impedance to said alternating voltage.

3. In combination, a direct current circuit, an alternating current circuit, a direct current inverting system energized from said direct current circuit for producing an alternating voltage, impedance means connecting said alternating current circuit with said system, and means including a saturable reactor having a saturating winding receiving a current proportional to the flow of current in said direct current circuit for causing said impedance means to offer a variable impedance to said alternating voltage.

4. In combination, a direct current circuit, an alternating current circuit, a direct current inverting system energized from said direct current circuit for producing an alternating voltage, impedance means connecting said alternating current circuit with said system, and means responsive to the magnitude of the flow of current in said direct current circuit for varying the frequency of said alternating voltage to vary the impedance of said impedance means.

5. In combination, a direct current circuit, an alternating current circuit, a direct current inverting system energized from said direct current circuit for producing an alternating voltage, impedance means connecting said alternating current circuit with said system, and means including a saturable reactor having a saturating winding receiving a current proportional to the flow of current in said direct current circuit for varying the frequency of said alternating voltages.

6. In combination, a direct current circuit, an alternating current circuit, a direct current inverting system connected with said direct current circuit to receive current therefrom, impedance means connected with said system to receive therefrom an alternating voltage substantially proportional to the voltage of said direct current circuit, connections between said impedance means and said alternating current circuit for impressing thereon an alternating voltage variable disproportionately to the voltage of said direct current circuit, and means for rendering the magnitude of the alternating voltage of said alternating current circuit substantially independent of the frequency thereof.

7. The combination with a direct current circuit, an alternating current circuit, and means for impressing an alternating voltage on the said alternating current circuit, of means comprising a second alternating current circuit having a non-linear volt-ampere characteristic linked with the first and second said circuits and operable upon the occurrence of a substantially resonant condition only in the second said means for controlling the said voltage impressed on the first said alternating current circuit.

8. The combination with a direct current circuit, and a relay, of means comprising an alternating current circuit having a non-linear volt-ampere characteristic coupling the first said circuit with said relay to cause the response of the latter only upon the occurrence of a substantially resonant condition in the said alternating current circuit.

9. The combination with a direct current circuit, and a relay, of means comprising an alternating current circuit having a non-linear current reactance characteristic coupling the first said circuit with said relay to cause the response of the latter only upon the occurrence of a substantially resonant condition in the said alternating current circuit.

10. The combination with a direct current circuit, and a translating device, of means comprising an alternating current circuit having a non-linear current reactance characteristic linked with the first said circuit and operable only upon the occurrence of a substantially resonant condition in the said alternating current circuit to vary the energization of said device to a large relative extent in response to a relative small increase of the voltage of the first said circuit above a predetermined value.

11. The combination with a direct current circuit, and a translating device, of means comprising an alternating current circuit having a non-linear current reactance characteristic coupling said circuit with said device and operable only upon the occurrence of a resonant condition in the said alternating current circuit to vary the energization of said device to a large relative extent in response to a relative small increase of the flow of current through the first said circuit above a predetermined value.

12. The combination with a direct current circuit, and a translating device, of means comprising an alternating current circuit having a non-linear current reactance characteristic linked with the first said circuit and operable only upon the occurrence of a substantially resonant condition in the said alternating current circuit to vary the energization of said device to a large relative extent in response to a small relative increase of the voltage of the first said circuit only above a predetermined value and below another greater predetermined value.

DIDIER JOURNEAUX.